US012674069B2

(12) United States Patent
Inoue

(10) Patent No.: US 12,674,069 B2
(45) Date of Patent: Jul. 7, 2026

(54) AQUEOUS INK FOR INK JET RECORDING, INK JET RECORDING DEVICE, AND INK JET RECORDING METHOD

(71) Applicant: BROTHER KOGYO KABUSHIKI KAISHA, Nagoya (JP)

(72) Inventor: Harumitsu Inoue, Kosai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 139 days.

(21) Appl. No.: 18/628,930

(22) Filed: Apr. 8, 2024

(65) Prior Publication Data

US 2024/0336796 A1     Oct. 10, 2024

(30) Foreign Application Priority Data

Apr. 10, 2023     (JP) ................................. 2023-063758

(51) Int. Cl.
| | |
|---|---|
| *C09D 11/38* | (2014.01) |
| *B41J 2/01* | (2006.01) |
| *B41J 2/21* | (2006.01) |
| *B41M 7/00* | (2006.01) |
| *C09D 11/107* | (2014.01) |
| *C09D 11/322* | (2014.01) |

(52) U.S. Cl.
CPC ................. *C09D 11/38* (2013.01); *B41J 2/01* (2013.01); *B41J 2/2107* (2013.01); *B41M 7/009* (2013.01); *C09D 11/107* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101;

C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 4,122,055 A | 10/1978 | Tugukuni et al. | |
| 5,609,671 A | 3/1997 | Nagasawa | |
| 5,837,045 A | 11/1998 | Johnson et al. | |
| 2003/0078320 A1 | 4/2003 | Yatake | |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2009/0229489 A1 | 9/2009 | Gu | |
| 2012/0313997 A1 | 12/2012 | Nakazawa et al. | |
| 2016/0152845 A1* | 6/2016 | Okada .................. | C09D 11/322 |
| | | | 524/386 |
| 2018/0237647 A1* | 8/2018 | Yamada .................. | B41J 3/4078 |
| 2018/0298214 A1* | 10/2018 | Takahashi .............. | C09D 11/38 |
| 2019/0284412 A1* | 9/2019 | Maekawa ............ | B41J 11/0024 |
| 2020/0094583 A1* | 3/2020 | Asakawa ........... | B41J 11/00216 |
| 2021/0024763 A1* | 1/2021 | Horiba ................. | C08K 5/3437 |
| 2022/0315780 A1* | 10/2022 | Okumura .............. | B41J 11/002 |
| 2022/0315784 A1* | 10/2022 | Inoue ................... | C09D 11/322 |
| 2022/0325119 A1* | 10/2022 | Miyasa ............... | C09D 11/322 |
| 2024/0166906 A1 | 5/2024 | Murakami et al. | |

FOREIGN PATENT DOCUMENTS

| | | |
|---|---|---|
| CN | 109021691 A | 12/2018 |
| EP | 0571187 A1 | 11/1993 |
| EP | 3733794 A1 | 11/2020 |
| EP | 4067445 A1 | 10/2022 |
| EP | 4424786 A1 | 9/2024 |
| JP | H08-3498 A | 1/1996 |
| JP | H08218026 A | 8/1996 |
| JP | 2000513396 A | 10/2000 |
| JP | 2003127351 A | 5/2003 |
| JP | 2008524400 A | 7/2008 |
| JP | 2009515007 A | 4/2009 |
| JP | 2011515535 A | 5/2011 |
| JP | 2013014745 A | 1/2013 |

(Continued)

OTHER PUBLICATIONS

Extended European Search Report issued Sep. 11, 2024, in corresponding European Patent Application No. 24169064.3, 7 pages.

*Primary Examiner* — Manish S Shah
(74) *Attorney, Agent, or Firm* — Element IP, PLC.

(57) ABSTRACT

An aqueous ink for ink jet recording according to the present disclosure includes: a pigment; resin particles; a crosslinking agent; and water, in which the resin particles are resin particles containing an acrylic resin, the crosslinking agent is an emulsified dispersion type or self-dispersion type blocked isocyanate, and a dissociation temperature of a blocking agent for the blocked isocyanate is 120° C. or lower.

13 Claims, 1 Drawing Sheet

(56)     References Cited

FOREIGN PATENT DOCUMENTS

| WO | WO-02026898  A1 | 4/2002 |
| WO | WO-2022201923  A1 | 9/2022 |
| WO | WO-2023074050  A1 | 5/2023 |

* cited by examiner

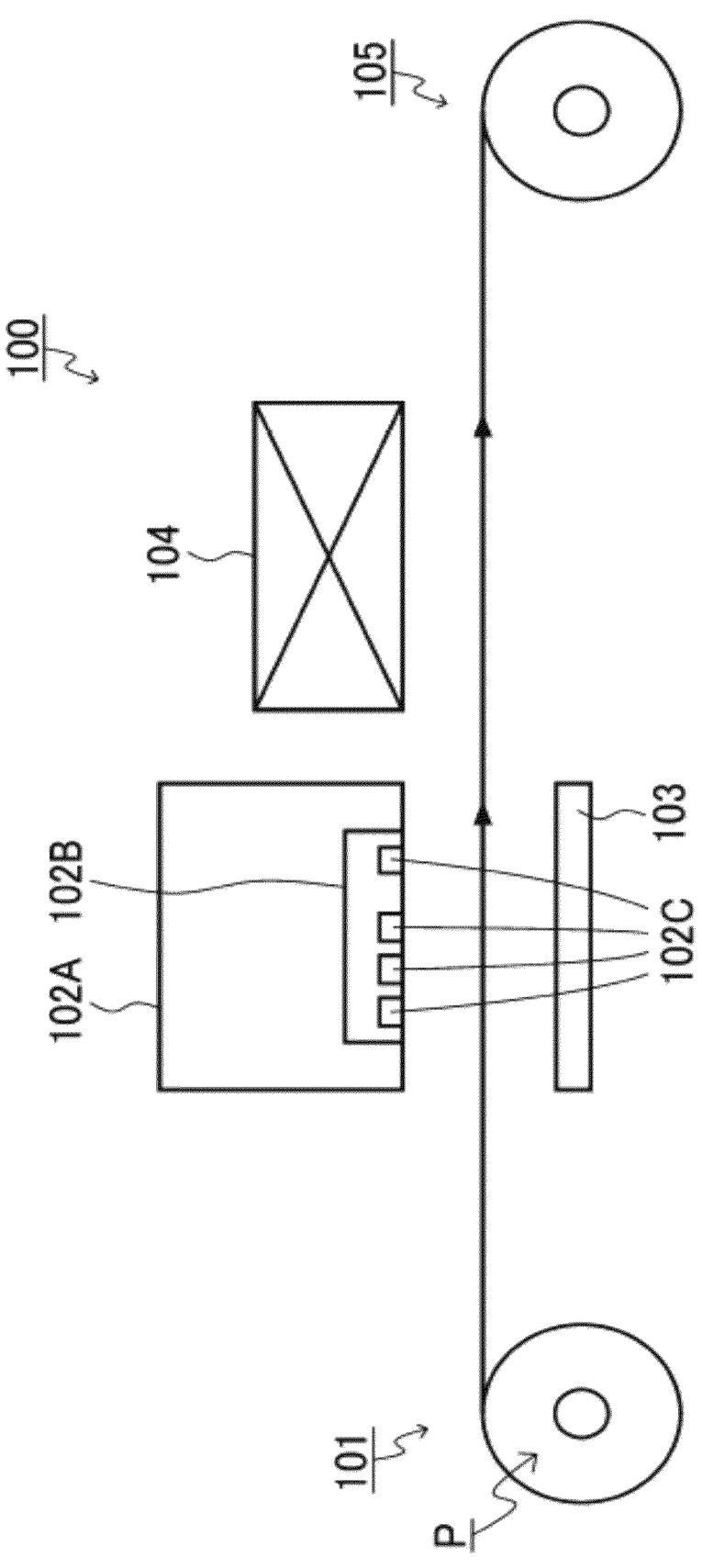

AQUEOUS INK FOR INK JET RECORDING, INK JET RECORDING DEVICE, AND INK JET RECORDING METHOD

REFERENCE TO RELATED APPLICATIONS

This application claims priority from Japanese Patent Application No. 2023-063758 filed on Apr. 10, 2023. The entire contents of the priority application is incorporated herein by reference.

BACKGROUND ART

Examples of an aqueous ink for ink jet recording include one described in a related art.

In recent years, consumers have become more aware of disinfection from the viewpoint of public health, and more and more printed images are required to have alcohol resistance. Examples of a unit for imparting alcohol resistance include a method of adding a crosslinking agent to an ink. On the other hand, when a general crosslinking agent is added to an ink, a problem may arise in storage stability due to a shortened pot life.

SUMMARY

Therefore, an object of the present disclosure is to provide an aqueous ink for ink jet recording that achieves both alcohol resistance and ink storage stability.

In order to achieve the above object, an aqueous ink for ink jet recording according to one aspect of the present disclosure contains:

a pigment;

resin particles;

a crosslinking agent; and water, in which the resin particles are resin particles containing an acrylic resin, the crosslinking agent is an emulsified dispersion type or self-dispersion type blocked isocyanate, and a dissociation temperature of a blocking agent for the blocked isocyanate is 120° C. or lower.

An ink jet recording device according to one aspect of the present disclosure includes:

an ink flow path; and an ink ejecting unit, in which the aqueous ink for ink jet recording according to the present disclosure supplied to the ink flow path is ejected onto an object, on which an image is to be formed, by the ink ejecting unit.

An ink jet recording method according to one aspect of the present disclosure includes:

a recording step; and a fixing step, in which the recording step is a step of performing recording by applying an aqueous ink to a recording medium using an ink jet method, the fixing step is a step of fixing the applied aqueous ink to the recording medium, and the aqueous ink for ink jet recording according to the present disclosure is used as the aqueous ink.

The aqueous ink for ink jet recording according to the present disclosure can achieve both alcohol resistance and ink storage stability.

BRIEF DESCRIPTION OF DRAWINGS

FIG. 1s a schematic diagram showing a configuration of an example of an ink jet recording device according to the present disclosure.

DESCRIPTION

In the present disclosure, the term "mass" may be referred to as "weight" unless otherwise specified. For example, "mass ratio" may be referred to as "weight ratio" unless otherwise specified, and "mass %" may be referred to as "wt %" unless otherwise specified.

In addition, when referring to a mechanism in the following embodiments and Examples, the described mechanism is merely an assumption, and the present disclosure is not limited to the described mechanism.

Aqueous Ink for Ink Jet Recording

An aqueous ink for ink jet recording according to the present disclosure (hereinafter, sometimes referred to as an "aqueous ink" or an "ink") will be described. The aqueous ink according to the present disclosure contains a pigment, resin particles, a crosslinking agent, and water.

The pigment is not particularly limited, and examples thereof include carbon black, an inorganic pigment, and an organic pigment. Examples of the carbon black include furnace black, lamp black, acetylene black, and channel black. Examples of the inorganic pigment include titanium oxide, an iron oxide-based inorganic pigment, and a carbon black-based inorganic pigment. Examples of the organic pigment include: azo pigments such as azo lake, an insoluble azo pigment, a condensed azo pigment, and a chelate azo pigment; polycyclic pigments such as a phthalocyanine pigment, a perylene and perinone pigment, an anthraquinone pigment, a quinacridone pigment, a dioxazine pigment, a thioindigo pigment, an isoindolinone pigment, and a quinophthalone pigment; dye lake pigments such as a basic dye lake pigment and an acidic dye lake pigment; nitro pigments; nitroso pigments; and aniline black daylight fluorescent pigments. Other pigments may be used as long as the pigment can be dispersed in an aqueous phase. Specific examples of these pigments include: C.I. Pigment Black 1, 6, and 7; C.I. Pigment Yellow 1, 2, 3, 12, 13, 14, 15, 16, 17, 55, 74, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C.I. Pigment Violet 19 and 196; C.I. Pigment Blue 1, 2, 3, 15, 15:1, 15:2, 15:3, 15:4, 16, 22, and 60; C.I. Pigment Green 7 and 36; and solid solutions of these pigments.

The pigment may be, for example, one that is dispersed in a solvent using a resin dispersant (also referred to as a resin dispersion pigment). As the resin dispersant, for example, a general polymer dispersant (also referred to as a resin for pigment dispersionor a resin dispersant) may be used, and the resin dispersant may be prepared. In addition, in the aqueous ink according to the present disclosure, the pigment may be encapsulated with a polymer. As the resin dispersant, for example, those containing at least one of methacrylic acid and acrylic acid as a monomer can be used, and for example, a commercially available product may be used. The resin dispersant may be, for example, a block copolymer, a graft copolymer, or a random copolymer made of hydrophobic monomers such as styrene, a styrene derivative, vinylnaphthalene, a vinylnaphthalene derivative, aliphatic alcohol esters of $\alpha,\beta$-ethylenically unsaturated carboxylic acids, or two or more monomers selected from the group consisting of acrylic acid, an acrylic acid derivative, maleic acid, a maleic acid derivative, itaconic acid, an itaconic acid derivative, fumaric acid, and a fumaric acid derivative, or a salt thereof. Examples of the commercially available product include: "Joncryl (registered trademark) 611", "Joncryl (registered trademark) 60", "Joncryl (registered trademark) 586", "Joncryl (registered trademark) 687", "Joncryl (registered trademark) 63", and "Joncryl (registered trademark) HPD296" manufactured by Johnson Polymer Co., Ltd.; "Disperbyk 190" and "Disperbyk 191" manufactured by BYK; and "Solsperse 20000" and "Solsperse 27000" manufactured by Zeneca Corporation.

Examples of a method for dispersing the pigment using the resin for pigment dispersion include dispersing the pigment using a dispersing device. The dispersing device used for dispersing the pigment is not particularly limited as long as the dispersing device is a general disperser, and examples thereof include a ball mill, a roll mill, and a sand mill (for example, a high-speed type sand mill).

The pigment may be, for example, a self-dispersion type pigment. The self-dispersion type pigment can be dispersed in water without using a dispersant, for example, by introducing at least one of a hydrophilic functional group such as a carbonyl group, a hydroxy group, a carboxylic acid group, a sulfonic acid group, and a phosphoric acid group, and a salt thereof into pigment particles by chemical bonding, either directly or through other groups. As the self-dispersion type pigment, for example, pigments treated by methods described in JPH08-3498A, JP2000-513396A, JP2008-524400A, JP2009-515007A, and JP2011-515535A can be used. As a raw material of the self-dispersion type pigment, either an inorganic pigment or an organic pigment can be used. In addition, examples of the pigment suitable for the treatment include carbon black such as "MA8" and "MA100" manufactured by Mitsubishi Chemical Corporation. The self-dispersion type pigment may be, for example, a commercially available product. Examples of the commercially available product include: "CAB-O-JET (registered trademark) 200", "CAB-O-JET (registered trademark) 250C", "CAB-O-JET (registered trademark) 260M", "CAB-O-JET (registered trademark) 270Y", "CAB-O-JET (registered trademark) 300", "CAB-O-JET (registered trademark) 400", "CAB-O-JET (registered trademark) 450C", "CAB-O-JET (registered trademark) 465M", and "CAB-O-JET (registered trademark) 470Y" manufactured by Cabot Corporation; "BONJET (registered trademark) BLACK CW-2" and "BONJET (registered trademark) BLACK CW-3" manufactured by ORIENT CHEMICAL INDUSTRIES CO., LTD; and "LIOJET (registered trademark) WD BLACK 002C" manufactured by TOYO INK CO., LTD.

A solid content of the pigment (pigment solid content) in a total amount of the aqueous ink is not particularly limited, and can be appropriately determined depending on, for example, a desired optical density and chroma. The pigment solid content is, for example, 0.1 mass % to 20 mass %, 1 mass % to 15 mass %, or 2 mass % to 10 mass %.

The resin particles are resin particles containing an acrylic resin. The resin particles may be contained in, for example, a polymer emulsion. The polymer emulsion is formed of, for example, the resin particles and a dispersion medium (for example, water), and the resin particles are not dissolved in the dispersion medium, but are dispersed with a specific particle diameter. The resin particles may be, for example, emulsion-dispersed or protective colloid-dispersed resin particles. In addition, the resin particles may be resin particles containing an acrylic styrene-based resin dispersed with a protective colloid.

The resin particles may further contain or may not contain, for example, a vinyl acetate-based resin, a carbonate resin, a polycarbonate resin, a styrene-based resin, an ethylene-based resin, a polyethylene-based resin, a propylene-based resin, a polypropylene-based resin, a urethane-based resin, a polyurethane-based resin, a polyester-based resin, and copolymer resins thereof. The resin particles may be used alone or in combination of two or more types thereof.

An average particle diameter of the resin particles is, for example, 5 nm to 500 nm, 20 nm to 300 nm, or 30 nm to 200 nm. The average particle diameter can be measured as an arithmetic mean diameter using, for example, a dynamic light scattering particle size distribution analyzer "LB-550" manufactured by Horiba, Ltd.

A solid content of the resin particles in the total amount of the aqueous ink may be, for example, 1.0 mass % or more, 3.0 mass % or more, 5.0 mass % or more, 5.5 mass % or more, or 7.0 mass % or more, and may be 30.0 mass % or less, 20.0 mass % or less, 11.0 mass % or less, 9.0 mass % or less, or 8.5 mass % or less. The resin particles may be used alone or in combination of two or more types thereof.

The crosslinking agent is an emulsified dispersion type or self-dispersion type blocked isocyanate. Here, the term "emulsified dispersion type" refers to one obtained by emulsifying and dispersing a compound by mixing with an emulsifier. The term "self-dispersion type" refers to one that can be dispersed in water without using a dispersant, for example, by introducing at least one of a hydrophilic functional group such as a carbonyl group, a hydroxy group, a carboxylic acid group, a sulfonic acid group, and a phosphoric acid group, and a salt thereof into a compound by chemical bonding, either directly or through other groups. Note that, the term "forced dispersion type" is one obtained by mechanically emulsifying and dispersing a hydrophobic compound using a homogenizer or the like. Therefore, in the present disclosure, the emulsified dispersion type and self-dispersion type blocked isocyanates are different from the forced dispersion type blocked isocyanate. The crosslinking agent may be used alone or in combination of two or more types thereof.

A dissociation temperature of a blocking agent for the blocked isocyanate is 120° C. or lower, may be, for example, 110° C. or lower, and may be 80° C. or higher, 90° C. or higher, or 100° C. or higher.

A solid content of the crosslinking agent in the total amount of the aqueous ink may be, for example, 0.3 mass % or more, 0.8 mass % or more, 1.5 mass % or more, 2.0 mass % or more, or 2.1 mass % or more, and may be 30.0 mass % or less, 20.0 mass % or less, 10 mass % or less, 5 mass % or less, 3.5 mass % or less, 3.0 mass % or less, or 2.5 mass % or less. The crosslinking agent may be used alone or in combination of two or more types thereof.

In the aqueous ink according to the present disclosure, a content ratio (B/A) of the solid content (B) of the crosslinking agent and the solid content (A) of the resin particles is 0.4 or less, may be, for example, less than 0.4, and may be 0.1 or more, 0.2 or more, or 0.3 or more, in the total amount of the aqueous ink.

The water may be ion exchanged water, pure water, or the like.

The water may be the main solvent. In the present disclosure, the term "main solvent" refers to the most abundant component among components constituting the solvent. A blending amount (water proportion) of the water with respect to the total amount of the aqueous ink is appropriately determined according to desired ink properties and the like. The water proportion may be, for example, the balance except for other components. For example, the blending amount of the water is 50 mass % to 95 mass %, preferably 55 mass % to 90 mass %, and more preferably 60 mass % to 80 mass %.

The aqueous ink may further contain a wetting agent, for example.

The wetting agent is not particularly limited, and examples thereof include: lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; keto alcohols such as diacetone alcohol; ethers such as tetrahydrofuran and dioxane; polyethers such as a polyalkylene glycol; alkylene glycols; polyhydric alcohols such as glycerin, trimethylolpropane, and trimethylolethane; 2-pyrolidone; N-methyl-2-pyrolidone; and 1,3-dimethyl-2-imidazolidinone. Examples of the polyalkylene glycol include polyethylene glycol and polypropylene glycol. Examples of the alkylene glycol include ethylene glycol, propylene glycol, butylene glycol, diethylene glycol, triethylene glycol, dipropylene glycol, tripropylene glycol, thiodiglycol, and hexylene glycol. These wetting agents may be used alone or in combination of two or more types thereof. Among them, alkylene glycols and polyhydric alcohols such as glycerin are preferred.

The aqueous ink may further contain, for example, a surfactant.

The surfactant is not particularly limited and may be appropriately selected depending on a purpose, and, for example, a commercially available product may be used. Specific examples of the surfactant include a silicone-based surfactant and an acetylene-based surfactant.

Examples of a commercially available product of the silicone-based surfactant include "SILFACE (registered trademark) SAG002", "SILFACE (registered trademark) SAG005", and "SILFACE (registered trademark) SAG503A" manufactured by Nissin Chemical Industry Co., Ltd.

Examples of a commercially available product of the acetylene-based surfactant include: "OLFINE (registered trademark) E1004", "OLFINE (registered trademark) E1008", and "OLFINE (registered trademark) E1010" manufactured by Nissin Chemical Industry Co., Ltd.; "SURFYNOL (registered trademark) 440", "SURFYNOL (registered trademark) 465", and "SURFYNOL (registered trademark) 485" manufactured by Air Products & Chemicals Inc.; and "Acetylenol (registered trademark) E40" and "Acetylenol (registered trademark) E100" manufactured by Kawaken Fine Chemicals Co., Ltd.

The aqueous ink may contain other surfactants in addition to or instead of the silicone-based surfactant or the acetylene-based surfactant. Examples of the other surfactants include: nonionic surfactants "EMULGEN (registered trademark)" series, "RHEODOL (registered trademark)" series, "EMASOL (registered trademark)" series, "EXCEL (registered trademark)" series, "EMANON (registered trademark)" series, "AMIET (registered trademark)" series, and "AMINON (registered trademark)" series manufactured by Kao Corporation; nonionic surfactants "SORBON (registered trademark)" series manufactured by TOHO Chemical Industry Co., Ltd.; nonionic surfactants "DOBANOX (registered trademark)" series, "LEOCOL (registered trademark)" series, "LEOX (registered trademark)" series, "LAOL, LEOCOL (registered trademark)" series, "LIONOL (registered trademark)" series, "CADENAX (registered trademark)" series, "LIONON (registered trademark)" series, and "LEOFAT (registered trademark)" series manufactured by Lion Corporation; anionic surfactants "EMAL (registered trademark)" series, "LATEMUL (registered trademark)" series, "VENOL (registered trademark)" series, "NEOPELEX (registered trademark)" series, NS SOAP, KS SOAP, OS SOAP, and "PELEX (registered trademark)" series manufactured by Kao Corporation; anionic surfactants "LIPOLAN (registered trademark)" series, "LIPON (registered trademark)" series, "SUNNOL (registered trademark)" series, "LIPOTAC (registered trademark) TE, ENAGICOL" series, "LIPAL (registered trademark)" series, and "LOTAT (registered trademark)" series manufactured by Lion Corporation; and cationic surfactants "CATIOGEN (registered trademark) ES-OW" and "CATIOGEN (registered trademark) ES-L" manufactured by DKS Co. Ltd.

The surfactant may be used alone or in combination of two or more types thereof.

The aqueous ink may further contain, for example, an organic solvent as a solvent other than the water.

The aqueous ink may further contain an additive known in the related art, if necessary. Examples of the additive include a pH adjuster, a viscosity modifier, a surface tension regulator, and an antifungal agent. Examples of the viscosity modifier include polyvinyl alcohol, cellulose, and a water-soluble resin.

Ink Jet Recording Device

An ink jet recording device according to the present disclosure will be described.

As described above, the ink jet recording device according to the present disclosure includes: an ink flow path; and an ink ejecting unit, in which the aqueous ink according to the present disclosure supplied to the ink flow path is ejected onto an object, on which an image is to be formed, by the ink ejecting unit.

A schematic diagram in FIGURE shows a configuration of an example of the ink jet recording device according to the present disclosure. As shown in FIGURE, an ink jet recording device 100 includes an unwinding unit 101, a conveyance mechanism (not shown) such as a roller, a recording mechanism, a platen 103, a drying unit 104, a winding unit 105, and an ink storage unit (not shown) such as an ink cartridge or an ink tank. Note that, FIGURE shows the ink jet recording device that includes the platen 103, the present disclosure is not limited thereto, and for example, an ink jet recording device that does not include the platen 103 may be used. In addition, the ink jet recording device according to the present disclosure may include, for example, a maintenance unit (not shown). The unwinding unit 101 can set a roll-shaped recording medium P. Although not shown, the ink storage unit and an ink ejecting unit (ink jet head 102B) are connected via an ink flow path, the aqueous ink is supplied to the ink flow path from the ink cartridge containing the aqueous ink, and the ink ejecting unit ejects the aqueous ink onto an object (recording medium) P on which an image is to be formed.

Inside the ink jet recording device 100, a conveyance path (not shown) is formed by a guide member. The recording medium P is conveyed from the unwinding unit 101 toward the winding unit 105 by the conveyance mechanism and the conveyance path, as shown by an arrow in FIGURE.

The recording mechanism includes a carriage 102A and the ink jet head (ink ejecting unit) 102B. The carriage 102A is supported by two guide rails (not shown) extending perpendicularly to a conveyance direction of the recording medium P. The two guide rails are supported by a housing (not shown) of the ink jet recording device 100. The carriage 102A is connected to a known belt mechanism (not shown) provided on the two guide rails. The belt mechanism is driven by a carriage motor (not shown). The carriage 102A connected to the belt mechanism reciprocates in a direction perpendicular to the conveyance direction of the recording medium P by driving of the carriage motor.

In addition, four ink tubes (not shown) that connect the ink storage unit and the ink jet head 102B, and a flexible flat cable (not shown) that electrically connects a control board (not shown) and the ink jet head 102B extend from the carriage 102A. With the four ink tubes, four color aqueous inks of yellow, magenta, cyan, and black contained in the ink storage unit are supplied to the ink jet head 102B. At least one of the four color aqueous inks is the aqueous ink for ink jet recording according to the present disclosure. The flexible flat cable transmits a control signal output from the control board to the ink jet head 102B.

The ink jet head 102B is mounted on the carriage 102A, as shown in FIGURE. A plurality of nozzles 102C are formed on a lower surface of the ink jet head 102B. Tips of the plurality of nozzles 102C are exposed from the lower surface of the carriage 102A and the ink jet head 102B. The ink jet head 102B includes an actuator (not shown) for applying a force to eject the aqueous ink supplied from the ink storage unit to the ink jet head 102B via the ink tubes. The actuator may be of any type, such as a piezoelectric element type, a thermal ink type, or an electrostatic attraction type. In the process of the carriage 102A reciprocating in the direction perpendicular to the conveyance direction of the recording medium P, the ink jet head 102B ejects the aqueous ink as minute ink droplets through the plurality of nozzles 102C. Accordingly, an image is recorded on the recording medium P. The platen 103 is disposed to face the recording mechanism, and supports the recording medium P conveyed from the unwinding unit 101. Note that, a roll-to-roll method is used the device shown in FIGURE, but the present disclosure is not limited thereto. The ink jet recording device may be a device using a line type ink jet head or a serial type ink jet head. Note that, the roll-to-roll method is a method for sending out and performing printing on the recording medium in a roll shape, and winding the recording medium in a roll shape again. The line type ink jet head is an ink jet head that covers the recording medium in the entire width direction thereof. The serial type ink jet head is an ink jet head that performs printing while reciprocating the ink jet head in the width direction of the recording medium.

The drying unit 104 dries a recording portion of the recording medium P. For example, in a case where the recording medium P is a non-absorbent recording medium, when the recording portion of the recording medium P is heated and dried by the drying unit 104, the aqueous ink ejected when the recording medium P is wound up into a roll shape is prevented from being transferred to a back surface of a recording surface. In addition, a partial reaction (reaction step to be described later) may occur between the resin particles and the crosslinking agent contained in the aqueous ink. The temperature on the recording medium P during the drying is, for example, 0.1 times to 10 times, 0.2 times to 8 times, or 0.5 times to 5 times the Tg of the resin particles. The drying unit 104 may be of any type as long as it can dry the recording portion. That is, the drying unit 104 does not need to involve heating as long as it can dry the recording portion. In addition, when heating is used in the drying unit 104, the heating method is not particularly limited, and may be any method such as heat transfer, convection, or radiation. Examples of the drying unit 104 include a dryer (air blower, hot air), an oven, a belt conveyor oven, an iron, a hot press machine, a plate heater, an IR heater, and a microwave. Preferred are non-contact drying units, such as a dryer, an oven, a belt conveyor oven, an IR heater, or a microwave, which heats and dries the recording portion of the recording medium P without being in contact with the recording portion.

An example is shown in which the recording portion of the recording medium P is heated and dried by the drying unit 104 disposed on an ink jet head 102B side so as to face the recording portion of the recording medium P in the device shown in FIGURE, but the present disclosure is not limited thereto. The drying unit 104 only needs to be able to heat and dry the recording portion of the recording medium P, and may be disposed, for example, on a side opposite to the recording portion of the recording medium P, that is, on the side facing the nozzles 102C of the ink jet head 102B.

The recording medium P after recording and drying is conveyed to the winding unit 105.

Ink Jet Recording Method

An ink jet recording method according to the present disclosure will be described.

An ink jet recording method according to the present disclosure includes: a recording step; and a fixing step, in which the recording step is a step of performing recording by applying an aqueous ink to a recording medium using an ink jet method, the fixing step is a step of fixing the applied aqueous ink to the recording medium, and the aqueous ink for ink jet recording according to the present disclosure is used as the aqueous ink.

The recording step and the fixing step can be performed using, for example, the ink jet recording device shown in FIGURE.

The ink jet recording method according to the present disclosure may be, for example, a method in which an intermediate transfer body is used as a recording medium on which an image is first recorded, an agglomerated liquid ejecting step and an aqueous ink ejecting step are performed on the intermediate transfer body, an image is formed on the intermediate transfer body, and then a transfer step is performed to transfer the image formed on the intermediate transfer body to a desired final recording medium.

In ink jet recording method according to the present disclosure, examples of the recording medium include a roll-shaped recording medium. Examples of the recording medium include a film medium, and a medium including a thermosensitive coloring layer. Examples of the film medium include a film medium having high heat resistance, such as a biaxially stretched PET resin and polyimide resin, and a film medium having low heat resistance including a polypropylene and vinyl chloride. Examples of the film medium having low heat resistance include, in addition to a polypropylene and vinyl chloride, an unstretched PET resin, a polyethylene, a polystyrene, an AS resin, an ABS resin, an acrylic resin, a methacrylic resin, a PVA resin, a nylon resin, and a polyurethane resin. The recording medium may be, for example, coated paper. In the present disclosure, the term "coated paper" refers to, for example, one obtained by coating plain paper made of pulp, such as high-grade printing paper or intermediate-grade printing paper, with a coating agent to improve smoothness, whiteness, glossiness, and the like. Specific examples include high-quality coated paper and medium-quality coated paper.

The fixing step includes, for example, a reaction step. The reaction step is, for example, a step of causing the crosslinking agent and the resin particles in the aqueous ink fixed on the recording medium to react with each other by heating. The reaction step may be performed, for example, by the drying unit 104 in the ink jet recording device shown in FIGURE. As described above, when the recording portion of the recording medium is heated and dried by the drying unit 104, a partial reaction may occur between the resin particles and the crosslinking agent contained in the aqueous ink. In addition, the reaction step may be performed using a heating unit other than the drying unit 104, or may be performed using a combination of the drying unit 104 and other heating units. Note that, when the drying unit 104 and the other heating units are used together, the heating temperature, the heating time, and the heat amount to be described later can be cumulative conditions of the heating performed by the drying unit 104 and the heating performed by the other heating units.

The fixing step may include, for example, heating to apply a certain heat amount to the recording portion of the recording medium. The heat amount may be, for example, 109 $J/cm^3$ or more, 152 $J/cm^3$ or more, or 196 $J/cm^3$ or more, and may be 414 $J/cm^3$ or less, 370 $J/cm^3$ or less, 239 $J/cm^3$ or less.

The heating temperature in the fixing step may be, for example, 60° C. or higher, 70° C. or higher, or 80° C. or higher, and may be 120° C. or lower, 110° C. or lower, 100° C. or lower, or 90° C. or lower. In addition, the heating time in the fixing step may have a lower limit of, for example, 10 hours or longer, or 12 hours or longer, and an upper limit thereof is not particularly limited, and may be, for example, one month or shorter, two weeks or shorter, one week or shorter, five days or shorter, three days or shorter, or one day or shorter.

The ink jet recording method according to the present disclosure can be performed by, for example, using the ink jet recording device according to the present disclosure. The recording includes printing words, printing an image, or printing.

According to the aqueous ink, the ink jet recording device and the ink jet recording method in the present disclosure, when one having a dissociation temperature of the blocking agent for the blocked isocyanate is 120° C. or lower is used as the crosslinking agent, and aging (the heating) at a low temperature is further performed for a long time, the alcohol resistance is ensured, and problems such as curling and shrinkage of a medium having low heat resistance are less likely to occur. In addition, when the ink is dried through the drying step, even when a roll-to-roll medium is wound up, the ink is less likely to transfer to the surface opposite to the recording side of the medium.

EXAMPLES

Next, Examples of the present disclosure will be described together with Comparative Examples. Note that the present disclosure is not limited or restricted by the following Examples and Comparative Examples.

Examples 1 to 20, and Comparative Examples 1 to 13

The components in aqueous ink compositions (Table 1 to Table 3) except for a coloring material (pigment) were mixed uniformly to obtain an ink solvent. Next, the coloring material was added to the ink solvent, followed by uniform mixing. Thereafter, the obtained mixture was filtered through a cellulose acetate type membrane filter (pore diameter: 3.00 μm) manufactured by TOYO ROSHI KAISHA, LTD. to obtain an aqueous ink for ink jet recording in each of Examples 1 to 20 and Comparative Examples 1 to 13 shown in Table 1 to Table 3.

Regarding the aqueous inks in Examples 1 to 20 and Comparative Examples 1 to 13, (a) alcohol resistance evaluation and (b) storage stability evaluation were performed using the following methods.

(a) Alcohol Resistance Evaluation

Printing was performed on thermosensitive synthetic paper (product name: FTS80-X43375 (10) DG, manufactured by NEION Film Coatings Corp.) using an ink jet printer (product name: MFC-J6995CDW, manufactured by Brother Industries, Ltd.) using any of the aqueous inks in Examples 1 to 20 and Comparative Examples 1 to 13. Thereafter, regarding two types, i.e., (1) one obtained by drying at 120° C. for 3 minutes (hereinafter, it may be referred to as "Condition 1"), and (2) one obtained by drying at 60° C. for 1 minute and then standing at 60° C. for 12 hours (hereinafter, it may be referred to as "Condition 2"), the alcohol resistance on the recording surface was evaluated. The alcohol resistance was evaluated based on a rate of change in OD value before and after using a cotton swab, impregnated with ethanol diluted with water to a concentration of 70%, to rub the recording surface 10 times with a load of 1 kg, according to the following evaluation criteria.

Evaluation criteria for alcohol resistance evaluation

A: the rate of change in OD value before and after rubbing is less than 10%

B: the rate of change in OD value before and after rubbing is 10% or more and less than 50%

C: the rate of change in OD value before and after rubbing is 50% or more (b) Storage Stability Evaluation The aqueous ink whose viscosity was measured immediately after preparation was charged into a sealed container and stored for one week in an environment at a temperature of 60° C. and a relative humidity of 40%. The viscosity of the evaluation sample thus prepared was measured, and the storage stability was evaluated according to the following evaluation criteria. The viscosity was measured at 25° C. using a viscometer (model: TVE-25, manufactured by Toki Sangyo Co., Ltd.).

Evaluation Criteria for Storage Stability Evaluation

A: the rate of change in viscosity after one week at 60° C. is less than 5%

B: the rate of change in viscosity after one week at 60° C. is 5% or more and less than 10%

C: the rate of change in viscosity after one week at 60° C. is 10% or more

The aqueous ink composition and the evaluation result of the aqueous ink in each of Examples 1 to 20 and Comparative Examples 1 to 13 are shown in Table 1 to Table 3.

TABLE 1

| Category | Material name | Solid content (active ingredients) (%) | Example | | | | | | | | | |
|---|---|---|---|---|---|---|---|---|---|---|---|---|
| | | | 1 | 2 | 3 | 4 | 5 | 6 | 7 | 8 | 9 | 10 |
| Coloring material | Carbon black | 100 | 4.0 | 4.0 | 4.0 | 4.0 | 4.0 | 4.0 | 4.0 | 4.0 | 4.0 | 4.0 |
| Resin particles | Mowinyl ® 6969D (acrylic, emulsified dispersion) | 42 | 26.3 | 13.2 | 15.6 | 21.5 | 17.9 | 16.7 | 20.3 | 16.7 | | |
| | SAIVINOL ® EK-61 (acrylic styrene, protective colloid dispersion) | 39 | | | | | | | | | 17.8 | |
| | SAIVINOL ® UC-6600 (acrylic, emulsified dispersion) | 46 | | | | | | | | | | 15.2 |
| | PESRESIN A-645GH (polyester) | 30 | | | | | | | | | | |
| | VYLON ® MD2000 (polyester) | 40 | | | | | | | | | | |
| | SUPERFLEX ® 210 (urethane) | 35 | | | | | | | | | | |
| Solvent | Propylene glycol | 100 | 22.0 | 22.0 | 22.0 | 22.0 | 22.0 | 22.0 | 22.0 | 22.0 | 22.0 | 22.0 |
| | Propylene glycol monopropyl ether | 100 | 2.0 | 2.0 | 2.0 | 2.0 | 2.0 | 2.0 | 2.0 | 2.0 | 2.0 | 2.0 |
| Cross-linking agent | ELASTRON ® BN-11 (forced emulsified, dissociation at 150° C., blocked isocyanate) | 35 | | | | | | | | | | |
| | ELASTRON ® BN-69 (emulsified dispersion, dissociation at 120° C., blocked isocyanate) | 41 | | | | | | | | | | |
| | ELASTRON ® BN-77 (self-dispersion, dissociation at 120° C., blocked isocyanate) | 31 | 7.1 | 6.8 | 8.4 | 8.7 | 9.7 | 9.0 | 11.0 | 6.8 | 6.8 | 6.8 |
| | MEIKANATE CX (emulsified dispersion, dissociation at 100° C. to 120° C., blocked isocyanate) | 40 | | | | | | | | | | |
| | SU268A (emulsified dispersion, dissociation at 100° C. to 120° C., blocked isocyanate) | 40 | | | | | | | | | | |
| | MEIKANATE TP10 (emulsified dispersion, dissociation at 130° C. to blocked 150° C., isocyanate) | 40 | | | | | | | | | | |
| | CARBODILITE ® E-05 (emulsified dispersion, carbodiimide) | 40 | | | | | | | | | | |
| | EPOCROS ® K-2010E (resin dispersion, oxazoline) | 40 | | | | | | | | | | |
| | DENACOL ® EX-512 (multifunctional, epoxy) | 100 | | | | | | | | | | |
| | Adipic acid dihydrazide (hydrazide) | 100 | | | | | | | | | | |
| Sur-factant | Silface ® SAG503A | 100 | 1.5 | 1.5 | 1.5 | 1.5 | 1.5 | 1.5 | 1.5 | 1.5 | 1.5 | 1.5 |
| Solvent | Water | 100 | Balance | Balance | Balance | Balance | Balance | Balance | Balance | Balance | Balance | Balance |
| | Total | | 100.0 | 100.0 | 100.0 | 100.0 | 100.0 | 100.0 | 100.0 | 100.0 | 100.0 | 100.0 |
| | Solid content (A) of resin particles | | 11.5 | 5.5 | 6.5 | 9.0 | 7.5 | 7.0 | 8.5 | 7.0 | 7.0 | 7.0 |
| | Solid content (B) of crosslinking agent | | 2.2 | 2.1 | 2.6 | 2.7 | 3.0 | 2.8 | 3.4 | 2.1 | 2.1 | 2.1 |
| | B/A | | 0.2 | 0.4 | 0.4 | 0.3 | 0.4 | 0.4 | 0.4 | 0.3 | 0.3 | 0.3 |
| Alcohol resistance | Drying at 120° C. | | B | B | B | A | A | A | A | A | A | A |
| | Drying at 60° C. and aging at 60° C. for 12 hours | | B | B | B | B | B | B | B | B | A | B |
| | Storage stability | | B | B | B | B | B | B | B | A | A | A |

TABLE 2

| Category | Material name | Solid content (active ingredients) (%) | Example 11 | 12 | 13 | 14 | 15 | 16 | 17 | 18 | 19 | 20 |
|---|---|---|---|---|---|---|---|---|---|---|---|---|---|
| Coloring material | Carbon black | 100 | 4.0 | 4.0 | 4.0 | 4.0 | 4.0 | 4.0 | 4.0 | 4.0 | 4.0 | 4.0 |
| Resin particles | Mowinyl ® 6969D (acrylic, emulsified dispersion) | 42 | 20.3 | | | 10.8 | 10.8 | 21.5 | 21.5 | 16.7 | 16.7 | 16.7 |
| | SAIVINOL ® EK-61 (acrylic styrene, protective colloid dispersion) | 39 | | 21.6 | | | | | | | | |
| | SAIVINOL ® UC-6600 (acrylic, emulsified dispersion) | 46 | | | 18.4 | | | | | | | |
| | PESRESIN A-645GH (polyester) | 30 | | | | | | | | | | |
| | VYLON ® MD2000 (polyester) | 40 | | | | | | | | | | |
| | SUPERFLEX ® 210 (urethane) | 35 | | | | | | | | | | |
| Solvent | Propylene glycol | 100 | 22.0 | 22.0 | 22.0 | 22.0 | 22.0 | 22.0 | 22.0 | 22.0 | 22.0 | 22.0 |
| | Propylene glycol monopropyl ether | 100 | 2.0 | 2.0 | 2.0 | 2.0 | 2.0 | 2.0 | 2.0 | 2.0 | 2.0 | 2.0 |
| Cross-linking agent | ELASTRON ® BN-11 (forced emulsified, dissociation at 150° C., blocked isocyanate) | 35 | | | | | | | | | | |
| | ELASTRON ® BN-69 (emulsified dispersion, dissociation at 120° C., blocked isocyanate) | 41 | | | | | | | | 5.1 | | |
| | ELASTRON ® BN-77 (self-dispersion, dissociation at 120° C., blocked isocyanate) | 31 | 8.2 | 8.2 | 8.2 | 2.9 | 1.5 | 2.9 | 5.8 | | | |
| | MEIKANATE CX (emulsified dispersion, dissociation at 100° C. to 120° C., blocked isocyanate) | 40 | | | | | | | | | 5.1 | |
| | SU268A (emulsified dispersion, dissociation at 100° C. to 120° C., blocked isocyanate) | 40 | | | | | | | | | | 5.1 |
| | MEIKANATE TP10 (emulsified dispersion, dissociation at 130° C. to 150° C., blocked isocyanate) | 40 | | | | | | | | | | |
| | CARBODILITE ® E-05 (emulsified dispersion, carbodiimide) | 40 | | | | | | | | | | |
| | EPOCROS ® K-2010E (resin dispersion, oxazoline) | 40 | | | | | | | | | | |
| | DENACOL ® EX-512 (multifunctional, epoxy) | 100 | | | | | | | | | | |
| | Adipic acid dihydrazide (hydrazide) | 100 | | | | | | | | | | |
| Sur-factant | Silface ® SAG503A | 100 | 1.5 | 1.5 | 1.5 | 1.5 | 1.5 | 1.5 | 1.5 | 1.5 | 1.5 | 1.5 |
| Solvent | Water | 100 | Balance | Balance | Balance | Balance | Balance | Balance | Balance | Balance | Balance | Balance |
| | Total | | 100.0 | 100.0 | 100.0 | 100.0 | 100.0 | 100.0 | 100.0 | 100.0 | 100.0 | 100.0 |
| | Solid content (A) of resin particles | | 8.5 | 8.5 | 8.5 | 4.5 | 4.5 | 9.0 | 9.0 | 7.0 | 7.0 | 7.0 |
| | Solid content (B) of crosslinking agent | | 2.5 | 2.5 | 2.5 | 0.9 | 0.4 | 0.9 | 1.8 | 2.1 | 2.0 | 2.0 |
| | B/A | | 0.3 | 0.3 | 0.3 | 0.2 | 0.1 | 0.1 | 0.2 | 0.3 | 0.3 | 0.3 |
| Alcohol resistance | Drying at 120° C. | | A | A | A | B | B | B | B | B | B | B |
| | Drying at 60° C. and aging at 60° C. for 12 hours | | B | A | B | C | C | C | C | C | C | C |
| | Storage stability | | A | A | A | A | A | B | B | B | B | B |

TABLE 3

| Category | Material name | Solid content (active ingredients) (%) | Comparative Example | | | | | | | | | | | | |
| --- | --- | --- | --- | --- | --- | --- | --- | --- | --- | --- | --- | --- | --- | --- | --- |
| | | | 1 | 2 | 3 | 4 | 5 | 6 | 7 | 8 | 9 | 10 | 11 | 12 | 13 |
| Coloring material | Carbon black | 100 | 4.0 | 4.0 | 4.0 | 4.0 | 4.0 | 4.0 | 4.0 | 4.0 | 4.0 | 4.0 | 4.0 | 4.0 | 4.0 |
| Resin particles | Mowinyl ® 6969D (acrylic, emulsified dispersion) | 42 | 16.7 | 16.7 | 16.7 | 16.7 | 16.7 | | | | | | | 16.7 | 16.7 |
| | SAIVINOL ® EK-61 (acrylic styrene, protective colloid dispersion) | 39 | | | | | | | | | | | | | |
| | SAIVINOL ® UC-6600 (acrylic, emulsified dispersion) | 46 | | | | | | | | | | | | | |
| | PESRESIN A-645GH (polyester) | 30 | | | | | | 23.2 | 23.2 | | | | | | |
| | VYLON ® MD2000 (polyester) | 40 | | | | | | | | 17.5 | 17.5 | | | | |
| | SUPERFLEX ® 210 (urethane) | 35 | | | | | | | | | | 20.0 | 20.0 | | |
| Solvent | Propylene glycol | 100 | 22.0 | 22.0 | 22.0 | 22.0 | 22.0 | 22.0 | 22.0 | 22.0 | 22.0 | 22.0 | 22.0 | 22.0 | 22.0 |
| | Propylene glycol monopropyl ether | 100 | 2.0 | 2.0 | 2.0 | 2.0 | 2.0 | 2.0 | 2.0 | 2.0 | 2.0 | 2.0 | 2.0 | 2.0 | 2.0 |
| Cross-linking agent | ELASTRON ® BN-11 (forced emulsified, dissociation at 150° C., blocked isocyanate) | 35 | | | | | | | | | | | | 4.0 | |
| | ELASTRON ® BN-69 (emulsified dispersion, dissociation at 120° C., blocked isocyanate) | 41 | | | | | | | | | | | | | |
| | ELASTRON ® BN-77 (self-dispersion, dissociation at 120° C., blocked isocyanate) | 31 | | | | | | | 6.8 | | 6.8 | | 6.8 | | |
| | MEIKANATE CX (emulsified dispersion, dissociation at 100° C. to 120° C., blocked isocyanate) | 40 | | | | | | | | | | | | | |

TABLE 3-continued

| Category | Material name | Solid content (active ingredients) (%) | Comparative Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| | SU268A (emulsified dispersion, dissociation at 100° C. to 120° C., blocked isocyanate) | 40 | | | | | | | | | | | | | 4.0 |
| | MEIKANATE TP10 (emulsified dispersion, dissociation at 130° C. to 150° C., blocked isocyanate) | 40 | | | | | | | | | | | | | |
| | CARBODILITE ® E-05 (emulsified dispersion, carbodiimide) | 40 | | 5.3 | | | | | | | | | | | |
| | EPOCROS ® K-2010E (resin dispersion, oxazoline) | 40 | | | 5.3 | | | | | | | | | | |
| | DENACOL ® EX-512 (multifunctional, epoxy) | 100 | | | | 2.1 | | | | | | | | | |
| | Adipic acid dihydrazide (hydrazide) | 100 | | | | | 2.1 | | | | | | | | |
| Sur-factant | Silface ® SAG503A | 100 | 1.5 | 1.5 | 1.5 | 1.5 | 1.5 | 1.5 | 1.5 | 1.5 | 1.5 | 1.5 | 1.5 | 1.5 | 1.5 |
| Solvent | Water | 100 | Bal-ance | Bal-ance | Bal-ance | Bal-ance | Bal-ance | Bal-ance | Bal-ance | Bal-ance | Bal-ance | Bal-ance | Bal-ance | Bal-ance | Bal-ance |
| | Total | | 100.0 | 100.0 | 100.0 | 100.0 | 100.0 | 100.0 | 100.0 | 100.0 | 100.0 | 100.0 | 100.0 | 100.0 | 100.0 |
| | Solid content (A) of resin particles | | 7.0 | 7.0 | 7.0 | 7.0 | 7.0 | 7.0 | 7.0 | 7.0 | 7.0 | 7.0 | 7.0 | 7.0 | 7.0 |
| | Solid content (B) of crosslinking agent | | 0.0 | 2.1 | 2.1 | 2.1 | 2.1 | 0.0 | 2.1 | 0.0 | 2.1 | 0.0 | 2.1 | 1.4 | 1.6 |
| | B/A | | 0.0 | 0.3 | 0.3 | 0.3 | 0.3 | 0.0 | 0.3 | 0.0 | 0.3 | 0.0 | 0.3 | 0.2 | 0.2 |
| Alcohol resistance | Drying at 120° C. | | C | C | C | C | B | A | B | A | C | A | B | C | C |
| | Drying at 60° C. | | C | C | C | C | B | B | B | B | C | B | C | C | C |
| | Storage stability | Drying at 60° C. and aging at 60° C. for 12 hours | 100.0 | 100.0 | 100.0 | 100.0 | 100.0 | 100.0 | 100.0 | 100.0 | 100.0 | 100.0 | 100.0 | 100.0 | 100.0 |

As shown in Table 1 and Table 2, in all of Examples 1 to 20, the alcohol resistance evaluation and the storage stability evaluation under Condition 1 are "B" or higher.

In addition, in all of Examples 1 to 13 in which a self-dispersion type blocked isocyanate is used, and the resin particles are 5.5 wt % or more and the crosslinking agent is 6.8 wt % or more, the alcohol resistance evaluation under the Condition 2 is "B" or higher. This is thought to be because, for example, when a self-dispersion type blocked isocyanate is used, unlike the case of using an emulsion type blocked isocyanate, there are no residual molecules (emulsifier) in a coating film, so that alcohol molecules do not enter the coating film with the residual molecules as a starting point. In addition, this is thought that when the amount of the resin particles is equal to or greater than a certain level, main constituent elements of the film are satisfied, and when the amount of the crosslinking agent is equal to or greater than a certain level, a crosslinked structure is sufficiently obtained, so that the alcohol resistance is improved.

Further, in all of Examples 4 to 13 in which the resin particles are 7.0 wt % or more, and the content ratio (B/A) is 0.3 or more, the alcohol resistance evaluation under the Condition 1 is "A". This is thought to be because, for example, when the content ratio (B/A) is equal to or greater than a certain level, that is, the amount of the crosslinking agent is equal to or greater than a certain level with respect to the resin particles, a sufficient crosslinked structure is obtained, so that the alcohol resistance is improved.

In addition, in all of Examples 8 to 13 in which the resin particles are 7.0 wt % or more and 8.5 wt % or less, and the content ratio (B/A) is 0.3 or more and less than 0.4, the storage stability evaluation is "A". This is thought that, for example, when the amount of the resin particles is within a certain range, no thickening occurs due to no interaction between the resin particles, so that the storage stability is improved. In addition, this is thought that when the content ratio (B/A) is within a certain range, the progress of the reaction between the resin particles and the crosslinking agent can be kept constant, so that the storage stability is improved.

In both Examples 9 and 12 in which a protective colloid dispersion type is used as the resin particles, the alcohol resistance and the storage stability under the conditions 1 and 2 are "A".

On the other hand, as shown in Table 3, Comparative Examples 1 to 13 that do not meet the requirements of the present disclosure are evaluated as "C" in at least one of the alcohol resistance evaluation and the storage stability evaluation under the condition 1.

Additional Notes

A part or all of the above embodiments and Examples may be described as the following notes, but the present disclosure is not limited thereto.

(1) An aqueous ink for ink jet recording containing:
a pigment;
resin particles;
a crosslinking agent; and
water, in which
the resin particles are resin particles containing an acrylic resin,
the crosslinking agent is an emulsified dispersion type or self-dispersion type blocked isocyanate, and
a dissociation temperature of a blocking agent for the blocked isocyanate is 120° C. or lower.

(2) The aqueous ink for ink jet recording according to (1), in which a content ratio (B/A) of a solid content (B) of the crosslinking agent to a solid content (A) of the resin particles is 0.4 or less in a total amount of the aqueous ink.

(3) The aqueous ink for ink jet recording according to (1) or (2), in which
in the total amount of the aqueous ink, the solid content of the resin particles is 5.5 wt % or more, and the solid content of the crosslinking agent is 2.1 wt % or more, and
the crosslinking agent is a self-dispersion type blocked isocyanate.

(4) The aqueous ink for ink jet recording according to any one of (1) to (3), in which
in the total amount of the aqueous ink, the solid content of the resin particles is 7.0 wt % or more, the solid content of the crosslinking agent is 2.1 wt % or more, and the content ratio (B/A) is 0.3 or more, and
the crosslinking agent is a self-dispersion type blocked isocyanate.

(5) The aqueous ink for ink jet recording according to any one of (1) to (4), in which
in the total amount of the aqueous ink, the solid content (A) of the resin particles is 7.0 wt % or more and 8.5 wt % or less, and the content ratio (B/A) is 0.3 or more and less than 0.4, and
the crosslinking agent is a self-dispersion type blocked isocyanate.

(6) The aqueous ink for ink jet recording according to any one of (1) to (5), in which
the resin particles are resin particles containing an acrylic styrene-based resin dispersed with a protective colloid,
in the total amount of the aqueous ink, the solid content (A) of the resin particles is 7.0 wt % or more and 8.5 wt % or less, and the content ratio (B/A) is 0.3 or more and less than 0.4, and
the crosslinking agent is a self-dispersion type blocked isocyanate.

(7) An ink jet recording device including:
an ink flow path; and
an ink ejecting unit, in which
the aqueous ink for ink jet recording according to any one of appendixes 1 to 6 supplied to the ink flow path is ejected onto an object, on which an image is to be formed, by the ink ejecting unit.

(8) An ink jet recording method including:
a recording step; and
a fixing step, in which
the recording step is a step of performing recording by applying an aqueous ink to a recording medium using an ink jet method,
the fixing step is a step of fixing the applied aqueous ink to the recording medium, and
the aqueous ink for ink jet recording according to any one of appendixes 1 to 6 is used as the aqueous ink.

(9) The recording method according to (8), in which
the fixing step includes a drying step, and
the drying step is a step of fixing a recording portion of the recording medium to the recording medium using a drying unit.

(10) The recording method according to (8) or (9), in which
the fixing step includes a reaction step, and
the reaction step is a step of causing the crosslinking agent and the resin particles in the aqueous ink fixed on the recording medium to react with each other by heating.

(11) The recording method according to any one of (8) to (10), in which the fixing step includes heating to apply a heat amount of 109 J/cm³ or more and 414 J/cm³ or less to the recording portion of the recording medium.

(12) The recording method according to any one of (8) to (11), in which the heating in the fixing step includes heating at 60° C. or higher for 10 hours or longer.

(13) The recording method according to any one of (8) to (12), in which the recording medium is a roll-shaped recording medium, and the recording medium is a film medium containing a polypropylene or vinyl chloride, or a medium including a thermosensitive coloring layer in a configuration.

While the invention has been described in conjunction with various example structures outlined above and illustrated in the FIGURES, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

INDUSTRIAL APPLICABILITY

In this way, the aqueous ink according to the present disclosure can achieve both alcohol resistance and ink storage stability. The aqueous ink according to the present disclosure is widely applicable to ink jet recording on various recording media.

What is claimed is:

1. An aqueous ink for ink jet recording comprising:
a pigment;
resin particles;
a crosslinking agent; and
water, wherein
the resin particles are resin particles containing an acrylic resin,
the crosslinking agent is a self-dispersion type blocked isocyanate, and
a dissociation temperature of a blocking agent for the blocked isocyanate is 120° C. or lower.

2. The aqueous ink for ink jet recording according to claim 1, wherein a content ratio (B/A) of a solid content (B) of the crosslinking agent to a solid content (A) of the resin particles is 0.4 or less in a total amount of the aqueous ink.

3. The aqueous ink for ink jet recording according to claim 1, wherein in a total amount of the aqueous ink, a solid content of the resin particles is 5.5 wt % or more, and a solid content of the crosslinking agent is 2.1 wt % or more.

4. The aqueous ink for ink jet recording according to claim 1, wherein in a total amount of the aqueous ink, a solid content (A) of the resin particles is 7.0 wt % or more, a solid content (B) of the crosslinking agent is 2.1 wt % or more, and a content ratio (B/A) of the solid content (B) of the crosslinking agent to the solid content (A) of the resin particles is 0.3 or more.

5. The aqueous ink for ink jet recording according to claim 1, wherein in a total amount of the aqueous ink, a solid content (A) of the resin particles is 7.0 wt % or more and 8.5 wt % or less, and a content ratio (B/A) of a solid content (B) of the crosslinking agent to the solid content (A) of the resin particles is 0.3 or more and less than 0.4.

6. The aqueous ink for ink jet recording according to claim 1, wherein the resin particles are resin particles containing an acrylic styrene-based resin dispersed with a protective colloid, and in a total amount of the aqueous ink, a solid content (A) of the resin particles is 7.0 wt % or more and 8.5 wt % or less, and a content ratio (B/A) of a solid content (B) of the crosslinking agent to the solid content (A) of the resin particles is 0.3 or more and less than 0.4.

7. An ink jet recording device comprising:
an ink flow path; and
an ink ejecting unit, wherein
the aqueous ink for ink jet recording according to claim 1 supplied to the ink flow path is ejected onto an object, on which an image is to be formed by the ink ejecting unit.

8. An ink jet recording method comprising:
(i) performing recording by applying the aqueous ink for ink jet recording according to claim 1 to a recording medium using an ink jet method, and
(ii) fixing the applied aqueous ink to the recording medium.

9. The recording method according to claim 8, wherein
the fixing (ii) includes fixing a recording portion of the recording medium to the recording medium using a drying unit.

10. The recording method according to claim 8, wherein
the fixing (ii) includes causing the crosslinking agent and the resin particles in the aqueous ink fixed on the recording medium to react with each other by heating.

11. The recording method according to claim 8, wherein
the fixing (ii) includes heating to apply a heat amount of 109 J/cm³ or more and 414 J/cm³ or less to a recording portion of the recording medium.

12. The recording method according to claim 11, wherein the heating is performed at 60° C. or higher for 10 hours or longer.

13. The recording method according to claim 8, wherein
the recording medium is a roll-shaped recording medium, and
the recording medium is a film medium containing a polypropylene or vinyl chloride, or a medium including a thermosensitive coloring layer in a configuration.

* * * * *